United States Patent [19]

Graves et al.

[11] Patent Number: 5,385,994

[45] Date of Patent: Jan. 31, 1995

[54] 2,5-SUBSTITUTED TETRAHYDROFURANS AS ANIONIC INITIATOR MODIFIERS

[75] Inventors: Daniel F. Graves, Clinton; James E. Hall, Mogadore; William J. Shuttleworth, Akron, all of Ohio

[73] Assignee: Bridgestone Corporation, Tokyo, Japan

[21] Appl. No.: 139,667

[22] Filed: Oct. 22, 1993

[51] Int. Cl.⁶ .................. C08F 4/48; C08F 297/04
[52] U.S. Cl. .................. 526/181; 526/173; 526/209; 525/271; 525/272; 525/314; 502/156; 502/172
[58] Field of Search .................. 526/181, 189, 209; 525/271, 272; 502/156, 172

[56] References Cited

U.S. PATENT DOCUMENTS

| | | | |
|---|---|---|---|
| 3,301,840 | 1/1967 | Zelinski | 526/181 |
| 3,847,883 | 11/1974 | Kamienski et al. | 526/181 X |
| 4,429,091 | 1/1984 | Hall | 526/181 |
| 5,112,929 | 5/1992 | Hall | 502/156 X |

Primary Examiner—Fred Teskin
Attorney, Agent, or Firm—Frank J. Troy, Sr.

[57] ABSTRACT

A method for improving the initiation efficiency during the anionic polymerization of 15 to 100 percent weight of a vinyl aromatic hydrocarbon monomers and 0 to 85 percent by weight of a conjugated diene monomer by conducting the polymerization in the presence of a catalytically effective amount of: (a) an organolithium initiator and (b) a 2,5-substituted tetrahydrofuran modifier having the structural formula:

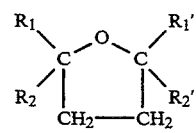

wherein $R_1$ and $R_1'$ are independently H or an alkyl group containing 1 to 4 carbon atoms and $R_2$ and $R_2'$ are alkyl group containing 1 to 4 carbon atoms.

15 Claims, No Drawings

2,5-SUBSTITUTED TETRAHYDROFURANS AS ANIONIC INITIATOR MODIFIERS

FIELD OF THE INVENTION

The present invention relates to a method of preparing polystyrene and block copolymers from conjugated diene monomers and vinyl aromatic hydrocarbon monomers by anionic initiation employing a 2,5-substituted tetrahydrofuran modifier. This modifier improves the initiation efficiency of vinyl aromatic hydrocarbon monomers and does not affect the 1,2-microstructure of diene contributed units during formation of a block copolymer.

BACKGROUND OF THE INVENTION

Use of modifiers systems in combination with anionic initiators in the polymerization of styrene/butadiene copolymers is well known. Such modifiers, however, both increase the 1,2-microstructure of the diene monomer contributed units of the copolymer finally produced and decrease the block styrene content.

Chelating modifiers including OOPS or TMEDA increase the 1,2-microstructure of the diene units of the copolymer finally produced. Non-chelating tertiary amine modifiers which remain with the polymers cause yellowing of the polymers during post polymerization processing such as extrusion and injection molding processes. Tetrahydrofuran (THF), a well-known non-chelating modifier, is known to react with C—Li bonds producing Li alkoxide. THF is difficult to remove from hydrocarbon polymerization media due to its low boiling point.

It is desirable to provide an anionic initiator/modifier system for preparing polystyrene having a narrow molecular weight distribution and for preparing block copolymers of styrene-butadiene having improved initiation rates without having their 1,2-microstructure affected by the presence of a modifier. It is also desirable to discover modifiers that are easily recoverable from solvent process streams.

SUMMARY OF THE INVENTION

The present invention relates to an anionic initiator modifier system and to a method for improving the efficiency of anionic initiators during the preparation of polystyrene and improving the efficiency of the anionic initiator during the preparation of vinyl aromatic hydrocarbon-diene block copolymers without affecting the microstructure of the diene contributed units. This method is performed by polymerizing a vinyl aromatic hydrocarbon monomer and optionally subsequently adding up to 85 percent by weight of a diene monomer in the presence of a catalytically effective amount of (a) an organolithium initiator and (b) a 2,5-substituted tetrahydrofuran modifier having the structural formula:

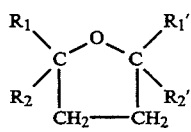

wherein $R_1$ and $R_1'$ are independent, and are each H or an alkyl group containing 1 to 4 carbon atoms and $R_2$ and $R_2'$ are independent and are each alkyl groups containing 1 to 4 carbon atoms.

It is an object of the present invention to provide a process for improving the initiation efficiency of vinyl aromatic hydrocarbon monomers during anionic initiated polymerization of vinyl aromatic monomers or block copolymerization of aromatic hydrocarbon monomers with subsequent addition of diene monomers.

Another object of the present invention is to provide a modifier for use with an anionic initiator which improves the anionic initiation efficiency during formation of block styrene and does not affect the vinyl content or 1,2-microstructure of the diene contributed units during formation of a diene-vinyl aromatic hydrocarbon block copolymer.

A further object of the present invention is to provide a method and a catalyst system to produce polystyrene or polymers of other vinyl aromatic monomers having a very narrow molecular weight distribution.

Still a further object of the present invention is to provide a modifier which can be easily removed from a hydrocarbon solvent process stream by simple distillation.

These objects and other advantages will become apparent from the following detailed description.

DETAILED DESCRIPTION OF THE INVENTION

The method of the present invention can be employed for the preparation of polymers of vinyl aromatic hydrocarbons or block copolymers of conjugated dienes and vinyl aromatic hydrocarbons.

Suitable vinyl aromatic hydrocarbon monomers for use in the preparation of polymers or copolymers include styrene, 1-vinylnaphthalene, 2-vinylnaphthalene, and alkyl, cycloalkyl, aryl, alkaryl, aralkyl, alkoxy, aryloxy, and dialkyl-amino derivatives thereof in which the total number of carbon atoms in the combined substituents is generally not greater than 12. Examples of these aromatic monomers include p-methylstyrene; alpha-methylstyrene; 3,5-diethylstyrene; 4-n-propylstyrene; 2,4,6-trimethylstyrene; 4-dodecylstyrene; 3-methyl-t-n-hexylstyrene; 4-cyclohexylstyrene; 4-phenylstyrene; 2-ethyl-4-benzylstyrene; 4-p-tolylstyrene; 3,5-tetramethylstyrene; 4-(4-phenyl-n-butyl)-styrene; 3-(4-n-hexylphenyl)-styrene; 4-methoxystyrene; 3,5-diphenoxystyrene, 2,6-dimethyl-4-hexoxystyrene; 4-dimethylaminostyrene; 3,5-diethylaminostyrene; 4-methoxy-6-di-n-propylamino-styrene; 4,5-dimethyl-1-vinylnaphthalene; 3-ethyl-1-vinyl-naphthalene; 6-isopropyl-1-vinyl-naphthalene; 2,4-diisopropyl-1-vinyl-naphthalene; 3,6-di-p-tolyl-1-vinylnaphthalene; 6-cyclohexyl-1-vinylnaphthalene; 4,5-diethyl-8-octyl-1-vinylnaphthalene; 3,4,5,6-tetramethyl-1-vinyl-naphthalene; 3,6-di-n-hexyl-1-vinylnaphthalene; 8-phenyl-1-vinylnaphthalene; 5-(2,4,6-trimethylphenyl)-1-vinyl-naphthalene; 3,6-di-ethyl-2-vinylnaphthalene; 7-dodecyl-2-vinylnaphthalene; 4-n-propyl-5-n-butyl-2-vinyl-naphthalene; 6-benzyl-2-vinylnaphthalene; 3-methyl-5,6-diethyl-8-n-propyl-2-vinylnaphthalene; 4-p-tolyl-2-vinylnaphthalene; 5-(3-phenyl-n-propyl)-2-vinylnaphthalene; 4-methoxy-1-vinylnaphthalene; 6-phenoxyl-1-vinylnaphthalene; 3,6-dimethylamino-1-vinylnaphthalene; 7-dihexony-2-vinylnaphthalene; and the like. The preferred vinyl aromatic hydrocarbon monomer for use in the method of the invention is styrene to produce polystyrene or a block copolymer containing styrene contributed blocks.

Diene monomers which may be employed in preparing the diene block copolymers are conjugated 1,3- diene monomers. These may contain from 4 to 12 carbon atoms, preferably from 4 to 8 carbon atoms per molecule.

Examples of these dienes include the following: 1,3-butadiene, isoprene; 2,3-dimethyl-1,3-butadiene; 1,3-pentadiene (piperylene); 2-methyl-3-ethyl-1,3-butadiene; 3-methyl-1,3-pentadiene; 2-methyl-3-ethyl-1,3-pentadiene; 2-ethyl-1,3-pentadiene; 1,3-hexadiene; 2-methyl-1,3-hexadiene; 1,3-heptadiene; 3-methyl-1,3-heptadiene, 1,3-octadiene; 3-butyl-1,3-octadiene; 3,4-dimethyl-1,3-hexadiene; 3-n-propyl-1,3-pentadiene; 4,5-diethyl-2,4-octadiene; phenyl-1,3-butadiene; 2,3-diethyl-1,3-butadiene; 2,3-di-n-propyl-1,3-butadiene; 2-methyl-3-isopropyl-1,3-butadiene; and the like. Among the dialkyl butadienes, it is preferred that the alkyl groups contain from 1 to 3 carbon atoms. Dienes containing alkoxy substituents along the chain can also be employed, such as 2-methoxy-1,3-butadiene, 2-ethoxy-3-ethyl-1,3-butadiene, and 2-ethoxy-3-methyl-1,3-hexadiene. The preferred 1,3-diene monomer for use in the method of the invention is 1,3-butadiene and the preferred block copolymer is a styrene/butadiene block copolymer.

The amount of conjugated diene monomer and vinyl aromatic hydrocarbon monomer included in the polymer and the block copolymers may vary considerably depending on the desired polymer properties. Thus, the polymers may contain from about 0 to about 85 percent by weight of blocks of conjugated diene units and from about 15 to about 100 percent by weight of blocks of vinyl aromatic hydrocarbon units. The preferred block copolymers are those containing greater than zero percent, and up to 75 percent by weight of blocks formed from conjugated diene monomer contributed units, and between 25 to less than 100 percent by weight of blocks formed from vinyl aromatic hydrocarbon monomer contributed units. Polystyrene having a narrow range molecular weight is a preferred polymer prepared according to the process of the present invention.

As indicated, component (a) of the catalyst composition of the invention is an organolithium initiator. The organolithium initiator employed may be any of the anionic organolithium initiators known in the art to be useful in the polymerization of 1,3-diene monomers or copolymerization of 1,3-diene monomers and vinyl aromatic hydrocarbon monomers. In general, the organolithium compounds are hydrocarbyl lithium compounds of the formula $R(Li)_x$ wherein R represents hydrocarbyl groups containing from one to about 20 carbon atoms, and preferably from about 2 to 8 carbon atoms and x is an integer from 1 to 4. Although the hydrocarbyl group preferably is an aliphatic group, the hydrocarbyl groups may also be cycloaliphatic or aromatic. The aliphatic groups may be primary, secondary or tertiary although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl and octadecyl. The aliphatic groups may contain some unsaturation such as allyl, 2-butenyl, and the like. Cycloalkyl groups are exemplified by cyclohexyl, methylcyclohexyl, ethylcyclohexyl, cycloheptyl, cyclopentylmethyl, methylcyclopentylethyl. Examples of aromatic hydrocarbyl groups include phenyl, tolyl, phenylethyl, benzyl, naphthyl, phenylcyclohexyl, and the like.

Specific examples of organolithium compounds which are useful as anionic initiators in the polymerization of conjugated dienes or copolymerization of conjugated dienes and vinyl aromatic hydrocarbons in accordance with the process of this invention include the following: n-butyl lithium, n-propyl lithium, isobutyl lithium, tertiary butyl lithium, amyl-lithium, cyclohexyl lithium.

Mixtures of different lithium initiator compounds also can be employed preferably containing one or more lithium compounds such as $R(Li)_x$. The preferred organolithium initiator is n-butyl lithium.

Other lithium catalysts which can be employed alone or in combination with the hydrocarbyl lithium initiators are lithium dialkyl amines, lithium dialkyl phosphines, lithium alkyl aryl phosphines and lithium diaryl phosphines.

The amount of initiator required to effect the desired polymerization can be varied over a wide range depending upon a number of factors such as the desired polymer molecular weight, the desired 1,2- and 1,4-content of the polydiene blocks, and the desired physical properties for the polymer produced. In general, the amount of initiator utilized may vary from as little as 0.20 millimole of lithium per 100 grams of monomers(s) up to about 100 millimoles of lithium per 100 grams of monomers(s) depending upon the desired polymer molecular weight.

The component (b) of the catalyst composition of the present invention is a 2,5-substituted tetrahydrofuran modifier having the structural formula:

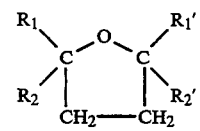

wherein $R_1$ and $R_1'$ are independently H or an alkyl group containing 1 to 4 carbon atoms and $R_2$ and $R_2'$ are independently alkyl groups containing 1 to 4 carbon atoms.

Preferred 2,5-substituted tetrahydrofuran modifiers for use in the catalyst system of the present invention include 2,5-dimethyl-tetrahydrofuran (2,5-DMTHF), and 2,2,5,5-tetramethyltetrahydrofuran (2,2,5,5-TMTHF) and 2-methyl-5-ethyltetrahydrofuran.

The amounts of 2,5-substituted tetrahydrofuran modifier employed in the polymerization reaction of the present invention is based upon the molar ratio of modifier (b) to initiator (a). The molar ratio of 2,5-substituted modifier (b) to organolithium initiator (a) may broadly range from 1.0:20.0 to 20.0:1.0 with the preferred range being from 1.0 to 5.0 to 5.0 to 1.0.

The catalyst mixture of the invention is employed in amounts sufficient to produce polymers and block copolymers of the desired molecular weights within a $M_w/M_n$ range. The amounts of catalyst mixture are selected so as to produce polymers having molecular weights ($M_n$) ranging from 1,000 to 1,000,000, preferably from 1,000 to 500,000.

The millimole ratio of the catalyst mixture to the weight of the monomers which is employed in the preparation of the polymers of the present invention is based on lithium per hundred grams of monomer.

The amount of modifier employed in producing the polymers of the present invention determines the amount of block styrene and the 1,2-microstructure in the diene contributed units of the block copolymer finally produced. Unlike chelating modifiers, a ratio of 2,5-substituted tetrahydrofuran modifier to anionic initiator of up to 5 to 1 does not significantly affect the microstructure of the diene contributed units of the final block copolymer. It has been determined that the block copolymers produced according to the process of this invention may have a 1,2-microstructure content ranging between about 8 to about 75 percent, preferably 8 to 25 percent in the diene blocks.

All amounts of anionic initiators and 2,5-substituted tetrahydrofuran modifiers as indicated by moles per grams of monomer or by ratio of components in the instant invention are considered to be catalytically effective amounts, that is, effective amounts for initiating and conducting polymerization of the disclosed monomer systems to produce a polymer or a copolymer containing a 1,2-microstructure ranging between about 8 to about 75 percent in the diene units.

The polystyrene polymers or other polymers of vinyl aromatic hydrocarbon monomers, or blocks prepared from these monomers produced in accordance with the present invention possess extremely narrow molecular weight distributions having a ratio of $M_w/M_n$ ranging from 1.02 to 1.25, preferably 1.02 to 1.15. This molecular weight distribution is attributed to the improved anionic initiation efficiency created by the use of the 2,5-substituted tetrahydrofuran modifiers.

Improved anionic initiation efficiency occurs when essentially all of the available initiator is utilized simultaneously to initiate a maximum amount of polymer living ends. By such a creation of the maximum amount of initiation sites, the polymers and blocks formed from the polymerization of vinyl aromatic monomers possess a narrow molecular weight distribution since each chain starts formation close to simultaneously and monomer units add onto the polymer claims at essentially equal rates until the monomer supply is exhausted. Since the 2,5-substituted tetrahydrofuran modifiers preferentially affect the anionic initiation rate of vinyl aromatic hydrocarbon monomers, these modifiers have no effect upon the vinyl content or 1,2-microstructure of the diene blocks in the polystyrene-polydiene type block copolymers. It is desirable to sequentially charge diene monomers into the polymerization reactor after initiation of the vinyl aromatic monomers has been conducted.

Process conditions such as the initial and maximum temperature of the polymerization reaction and the absolute concentration of modifier can independently affect the final 1,2-microstructure content of the 1,3-diene polymers. These conditions can be controlled for each monomer reaction system to produce the final desired 1,2-microstructure content of from about 8 to about 75 percent. It is desirable to produce block copolymers having a microstructure between 8 and 25 percent in the diene blocks.

The term microstructure as used in the present invention actually refers to the mode of addition of a growing polymer chain with a conjugated diene monomer unit. Either 1,2-addition or 1,4-addition can occur. In terms of nomenclature this results in 1,2-or 1,4-microstructure for the monomer unit in the polymer chain when 1,3-butadiene is the monomer. When isoprene is the monomer, 3,4- or 1,4-microstructure most generally results with a smaller amount of 1,2-microstructure in the polymer chain. Naming of the polymer structure which results from 1,2-addition is thus dependent on the monomer being polymerized. For simplicity, the term 1,2-microstructure is employed to describe the microstructure which results from 1,2-addition of conjugated dienes.

It is particularly noted that the 2,5-substituted tetrahydrofuran modifiers of the present invention improve the anionic initiation efficiency of the anionic initiator during polymerization of vinyl aromatic hydrocarbon monomers and during block copolymerization of dienes and vinyl aromatic hydrocarbon monomers. Anionic initiation efficiency is based upon the percentage of anionic initiator that is used to create live polymer chain ends during anionic polymerization. A 100 percent anionic initiation efficiency is achieved when each molecule of the initiation is utilized to create a live polymer end.

The 1,2-microstructure of the diene contributed units of the copolymers is not significantly effected by the modifiers of the present invention during copolymerization.

The polymerization of the monomers in the process of the catalyst composition of the invention is generally conducted in a solution of the monomers in an inert hydrocarbon solvent or diluent in which the monomers, initiator and modifier are soluble. The preferred hydrocarbon solvents are alkanes such as ethane, propane, pentane, hexane, heptane, octane, cyclopentane, cyclohexane, cycloheptane and the like. Aromatic solvents such as toluene may act as telomerizing agents and can be used when lower molecular weight polymers are desired. A particularly preferred hydrocarbon solvent is n-hexane, most preferably commercial hexane containing at least 50% of n-hexane and less than 1% of aromatic solvents. The solvents can be employed alone or in combination, e.g. as a hydrocarbon distillate fraction.

The amounts of hydrocarbon solvent employed in the solution polymerization of the monomers may range from 10 to 95 percent with preferred amounts being from 65 to 85 percent.

The polymerization of the monomers in the aforementioned system is preferably effected adiabatically with an increase in temperature occurring during the course of the reaction. As used in this connection the term adiabatic polymerization means that heat is neither supplied nor removed during the course of polymerization.

The present polymerization system is applicable to solution polymerization techniques which are conducted at temperatures of 0° to 160° C., preferably 40° to 140° C. Any temperature in this range of 0° C. to 160° C., which gives a convenient polymerization rate while producing a polymer having a desired 1,2-microstructure content is acceptable. If the operation is to be conducted as a batch operation, initiation temperatures of less than 90° C. are preferred. If the operation is to be a continuous operation higher initiation temperatures can be employed, such as 100° C. to 120° C., and it is preferred that the polymerization process be maintained in a range of from 80° C. to 160° C., most preferably 100° C. to 140° C.

The polymerization reaction can be performed at pressures between 0.5 to 100 atmospheres. When the desired degree of polymerization has been reached, the polymer can be isolated by precipitation with a non-solvent such as methanol, isopropanol or water and an appropriate antioxidant can be added at this stage of polymerization. The recovered polymer or copolymer can be dried using any convenient drying process such as drum drying. The 2,5-substituted tetrahydrofurans are easily recovered from the solvent process by fractional distillation. The polymers and copolymers depending on their molecular weight and composition may be used for a variety of applications ranging from molding materials and adhesives to rubber products such as thermoplastic elastomers.

The following examples are submitted for the purpose of further illustrating the nature of the present invention and are not intended as a limitation on the scope thereof. Parts and percentages shown in the examples are by weight unless otherwise indicated.

The following examples illustrate the preparation of butadiene/styrene copolymers utilizing the catalyst/modifier systems of the present invention. In the examples, the polymerizations were conducted in 16 ounce crown-capped bottles using hexane as the polymerization solvent. The 1,3-butadiene monomer was added as a 33 percent solution in hexane. The styrene monomer was added as a 33 percent solution in hexane. The n-butyllithium initiator (hereinafter n-BuLi) was added as a three percent solution in hexane. The 2,5-substituted tetrahydrofurans employed in the following examples are 2,5-dimethyltetrahydrofuran (2,5-DMTHF) or 2,2,5,5-tetramethyltetrahydrofuran (2,2,5,5-TMTHF). In comparative examples, 2,2-bis-oxolano propane (OOPS) was used as a modifier as a five percent solution in hexane.

In Examples 1 to 10, the styrene monomer solutions were charged into the bottles together with the n-BuLi and the identified modifier. The butadiene monomer solutions were subsequently charged into the bottles. The bottles were then placed in rotating water bath and polymerized for 2 hours at 70° C. The resultant copolymers were analyzed for 1,2-microstructure and for styrene content using Infrared Spectroscopy (IR).

EXAMPLES 1 to 10

In these examples, butadiene/styrene diblock copolymers were prepared having a charges of 76 g. of hexane, 27.3 g. of styrene in hexane, 63.6 g. of 1,3-butadiene in hexane, 1.5 ml of 3 percent of n-BuLi in hexane and a modifier selected from a 5 percent solution of 2,2-bis-oxolano propane in hexane (OOPS), 0.476 percent solution of 2,5-DMTHF in hexane or a 2.0 percent solution of 2,2,5,5-TMTHF in hexane. Modifier amounts (ml), molar ratio of modifier to initiator, and the properties of the formed diblock copolymers are shown on Table I.

These examples display the effectiveness of the 2,5-substituted tetrahydrofurans in comparison to a known modifier of 2,2-bis-oxolano propane. Examples 1 and 10 used no modifier.

EXAMPLES 11 to 13

In examples 11 to 13, polystyrene was prepared using an anionic initiator and either no modifier, or 2,5-DMTHF or 2,2,5,5-TMTHF as a modifier. Each polymerization was conducted for two hours at 70° C. using 20 grams of hexane solvent, 20 ml of a styrene/butadiene diblock dispersant, 5.5 ml of a three percent of styrene monomer in hexane. The target $M_n$ for the polymers solution of n-BuLi in hexane and 39.4 g of a 33 percent solution based on the initiator was 10,000. When present, the modifiers were used in a 1:1 molar ratio to the n-BuLi. The unreacted catalyst was calculated from $M_k$ vs. $M_n$. Amounts of modifier, unreacted initiator and resultant polystyrene properties are shown in Table II.

TABLE II

| EXAMPLE NO. | 11 | 12 | 13 |
|---|---|---|---|
| Modifier/Li (molar ratio) | — | 1:1 | 1:1 |
| 2,5-DMTHF (ml) (4.76% in hexane) | — | 5.4 | — |
| 2,2,5,5-TMTHF (ml) (20% in hexane) | — | — | 1.6 |
| $M_n$ | 12159 | 9804 | 8838 |
| $M_w$ | 16014 | 11132 | 9699 |
| $M_w/M_n$ | 1.32 | 1.14 | 1.10 |
| % unreacted n-BuLi | 18 | 0 | 0 |

What is claimed is:

1. A method for preparing a polymer or block copolymer comprising polymerizing 15 to 100 percent by weight of a vinyl aromatic hydrocarbon monomer and 0 to 85 percent by weight of a diene monomer in a hydrocarbon solvent in the presence of a catalytically effective amount of a catalyst composition comprising:
   (a) an organolithium initiator; and
   (b) a 2,5-substituted tetrahydrofuran having the structural formula:

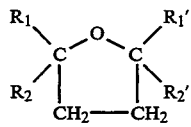

wherein $R_1$ and $R_1'$ are independently selected from the group consisting of H and alkyl groups containing from 1 to 4 carbon atoms and $R_2$ and $R_2'$ are independent and are alkyl groups containing from 1 to 4 carbon atoms.

TABLE I

| EXAMPLE NO. | 1 | 2 | 3 | 4 | 5 | 6 | 7 | 8 | 9 | 10 |
|---|---|---|---|---|---|---|---|---|---|---|
| Modifier (ml) | | | | | | | | | | |
| OOPS | — | 0.063 | 0.63 | — | — | — | — | — | — | — |
| 2,5-DMTNF | — | — | — | 0.72 | 7.2 | — | — | — | — | — |
| 2,2,5,5-TMTHF | — | — | — | — | — | 0.22 | 2.2 | 3.7 | 18.3 | — |
| Modifier/Li (molar ratio) | — | .03:1 | .3:1 | .06:1 | .6:1 | .06:.1 | 0.6:1 | 1:1 | 5:1 | — |
| Properties | | | | | | | | | | |
| % Block Styrene | 20.2 | 16.4 | 0.13 | 19.6 | 17.3 | 17.2 | 20.7 | 24.2 | 22.0 | 24.9 |
| % Bound Styrene | 29.9 | 30.9 | 31.6 | 28.8 | 28.9 | 26.5 | 29.4 | 29.2 | 30.7 | 31.6 |
| $M_n$ | 101512 | 100416 | 136758 | 105463 | 113664 | 114198 | 101170 | 107257 | 111835 | 103875 |
| $M_w$ | 114975 | 112588 | 167415 | 119819 | 129819 | 130852 | 113554 | 119486 | 123976 | 116121 |
| $M_w/M_n$ | 1.13 | 1.12 | 1.22 | 1.13 | 1.14 | 1.15 | 1.12 | 1.11 | 1.11 | 1.12 |
| cis | 30.1 | 28.4 | 17.5 | 30.1 | 28.7 | 30.3 | 29.8 | 30.4 | 30.1 | 31.9 |
| trans | 60.8 | 57.9 | 34.5 | 60.9 | 60.4 | 60.9 | 60.7 | 59.9 | 57.9 | 59.4 |
| 1,2-Microstructure | 9.1 | 13.7 | 43.1 | 9.0 | 10.9 | 8.8 | 9.5 | 9.7 | 12.0 | 8.6 |

2. The method of claim 1 wherein the diene monomer is 1,3-butadiene.

3. The method of claim 1 wherein the diene monomer is isoprene.

4. The method of claim 1 wherein the vinyl aromatic hydrocarbon monomer is styrene.

5. The method of claim 1 wherein said block copolymer is prepared by polymerizing from greater than 0 to about 75 percent by weight of diene monomer and from about 25 to less than 100 percent by weight of vinyl aromatic hydrocarbon monomer.

6. The method of claim 1 wherein the organolithium initiator is n-butyllithium.

7. The method of claim 1 wherein said 2,5-substituted tetrahydrofuran is 2,5-dimethyltetrahydrofuran.

8. The method of claim 1 wherein said 2,5-substituted tetrahydrofuran is 2,2,5,5-tetramethyltetrahydrofuran.

9. The method of claim 1 wherein the molar ratio of 2,5-substituted tetrahydrofuran to organolithium initiator ranges between from 1:20 to 20:1.

10. The method of claim 1 wherein the polymerization is conducted at a temperature in the range of from about 0° to about 160° C.

11. A catalyst composition comprising:
(a) an anionic initiator; and
(b) a 2,5-substituted tetrahydrofuran having the structural formula:

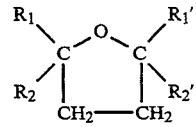

wherein $R_1$ and $R_1'$ are independently selected from the group consisting of H and alkyl groups containing from 1 to 4 carbon atoms and $R_2$ and $R_2'$ are independent and are alkyl groups containing from 1 to 4 carbon atoms.

12. The catalyst composition of claim 11 wherein the anionic initiator is an organolithium initiator.

13. The catalyst composition of claim 11 wherein the 2,5-substituted tetrahydrofuran is 2,5-dimethyltetrahydrofuran.

14. The catalyst composition of claim 11 wherein the 2,5-substituted tetrahydrofuran is 2,2,5,5-tetramethyltetrahydrofuran.

15. The catalyst composition of claim 11 wherein the molar ratio of 2,5-substituted tetrahydrofuran to anionic initiator ranges between from 1:20 to 20:1.

* * * * *

UNITED STATES PATENT AND TRADEMARK OFFICE
CERTIFICATE OF CORRECTION

PATENT NO. : 5,385,994
DATED : January 31, 1995
INVENTOR(S) : Daniel F. Graves, et al.

It is certified that error appears in the above-indentified patent and that said Letters Patent is hereby corrected as shown below:

Column 8, line 8, insert after the words "three percent" the following --solution of n-BuLi in hexane and 39.4 g of a 33 percent solution--

Column 8, line 10, delete the phrase "solution of n-BuLi in hexane and 39.4 g of a 33 percent solution"

Column 8, line 50, "are independent and" should read --are independently selected and--

Signed and Sealed this

Ninth Day of January, 1996

Attest:

BRUCE LEHMAN

Attesting Officer

Commissioner of Patents and Trademarks